(12) United States Patent
Jacobs et al.

(10) Patent No.: US 6,644,625 B1
(45) Date of Patent: Nov. 11, 2003

(54) PISTOL GRIP HOSE NOZZLE WITH PROPORTIONAL FLOW CONTROL

(75) Inventors: Scott Jacobs, Bloomington, IL (US); Lawrence P. Heren, East Peoria, IL (US)

(73) Assignee: L. R. Nelson, Peoria, IL (US)

( * ) Notice: Subject to any disclaimer, the term of this patent is extended or adjusted under 35 U.S.C. 154(b) by 0 days.

(21) Appl. No.: 09/637,750

(22) Filed: Aug. 11, 2000

(51) Int. Cl.⁷ .................................................. F16K 5/04
(52) U.S. Cl. ...................................... 251/209; 251/309
(58) Field of Search ................................. 251/208, 209, 251/309, 312, 313

(56) References Cited

U.S. PATENT DOCUMENTS

| | | | |
|---|---|---|---|
| 1,290 A | * 8/1839 | Kellogg et al. ............. 251/309 |
| 400,363 A | 3/1889 | Russ |
| 594,633 A | 11/1897 | Lunken |
| 666,171 A | 1/1901 | Whiting |
| 1,354,460 A | * 9/1920 | Heylman ..................... 251/312 |
| 1,417,592 A | 5/1922 | Bugenhagen |
| 1,511,081 A | 10/1924 | Johnson |
| 1,622,406 A | 3/1927 | Wilhjelm |
| 1,883,190 A | 10/1932 | Welcker |
| 2,129,511 A | 9/1938 | Tompkins et al. |
| 2,141,428 A | * 12/1938 | Carroll ........................ 251/208 |
| 2,158,737 A | 5/1939 | Wunsch |
| 2,212,284 A | 8/1940 | Wolff |
| 2,898,081 A | * 8/1959 | Johnson ....................... 251/309 |
| 3,157,200 A | 11/1964 | Rowan |
| 3,446,477 A | 5/1969 | Ainsworth et al. |
| 3,542,338 A | * 11/1970 | Scaramucci ................. 251/209 |
| 3,770,328 A | 11/1973 | Yarber |
| 3,964,728 A | * 6/1976 | Flider ...................... 251/313 X |
| 4,693,450 A | 9/1987 | Paetzel |
| 4,776,517 A | 10/1988 | Heren |
| 4,997,131 A | 3/1991 | Heren |
| 5,019,054 A | * 5/1991 | Clement et al. ......... 251/209 X |
| 5,072,599 A | 12/1991 | Simone |
| D325,620 S | 4/1992 | Heren |
| 5,107,884 A | 4/1992 | Orlandi |
| 5,445,361 A | 8/1995 | Hellman, Sr. |
| 5,524,863 A | * 6/1996 | Davis ...................... 251/209 X |
| 6,039,304 A | 3/2000 | Carlson et al. |

* cited by examiner

*Primary Examiner*—Gene Mancene
*Assistant Examiner*—Eric Keasel
(74) *Attorney, Agent, or Firm*—Mayer, Brown, Rowe & Maw LLP.

(57) ABSTRACT

A pistol grip hose nozzle is disclosed which allows proportional water control in accordance with the position of a rotatable valve. The hose nozzle has a handgrip section with an inlet water passage and an outlet section with an outlet water passage. One end of the handgrip section is connectable with a hose. The other end of the inlet water passage ends in a valve seat with an aperture. The valve seat contains a valve having a flow control cylinder. The flow control cylinder has a non-circular opening which when aligned with the aperture allows water to flow to the outlet water passage. The flow control cylinder is attached to a control knob which allows a user to grip the hand grip portion and rotate the control knob and the flow control cylinder to vary the water flow. The non-circular opening allows the amount of water flow to the outlet water passage to be linearly proportional to the rotational position of the control knob.

13 Claims, 7 Drawing Sheets

PISTOL GRIP HOSE NOZZLE WITH PROPORTIONAL FLOW CONTROL

FIELD OF INVENTION

This invention relates to a pistol grip hose nozzle. More specifically, this invention relates to a pistol grip hose nozzle with a flow cylinder which has a non-circular outlet permitting roughly linearly proportional water flow to the valve actuation.

BACKGROUND OF INVENTION

It is well known that certain irrigation devices allow some form of user control over the flow rate which is issued from the device. Typically, an irrigation device may be a pistol grip hose nozzle. A typical pistol-grip nozzle includes a tubular body having a handle portion connectable at one end to a garden hose. The body has a fixed barrel portion extending from the opposite end of the hose connector at an angle similar to the angle between the handle and barrel of a pistol. The water stream issues from the nozzle at the forward end of the barrel. The pattern and flow rate of the water stream is determined by a valve stem extending through the barrel portion and outwardly through the rear end thereof. The movement of the stem is controlled by a pivoted actuating lever or knob which enabling the user to grip the handle portion and rotate the knob to adjust the water stream issuing from the nozzle. Rotating the knob opens the valve by rotating a flow cylinder. The flow cylinder has an outlet to the barrel and a circular port which is accessed by the flow in the handle portion by opening the valve. Once the knob is turned, the flow cylinder rotates and exposes the circular port to water flow thus opening the valve.

Certain pistol-grip type hose nozzles allow a user to separately control the pattern of the water stream and the flow rate. The pistol-grip type hose nozzle allows ease of use because the stream varying structure may be moved into and out of its fully closed position from and into any operating position. Additionally, a user may operate the pistol nozzle with only one hand since only one hand is required both to hold the nozzle and rotate the knob to actuate the water stream.

However, because the area of the circular opening in the valve is not linearly proportional to the water flow, the water flow is not proportional to the distance the trigger is depressed. Thus, it is difficult for a user to control the water stream in a conventional pistol barrel type hose nozzle since the user cannot gauge the water flow accurately based on the degree of trigger depression. Additionally, changing the flow pattern of the water stream necessitates changing the flow rate in existing hose nozzles.

The inability to linearly relate the amount of water flow to the degree of valve actuation is endemic to many other valve operated devices such as sprinklers. Devices such as sprinklers require constant and proportional water flow to prevent over watering and to conserve water. Thus, the inability to control water flow precisely through a valve impedes the ability to predict irrigation patterns and precipitation.

Thus, there exists a need for a valve which permits proportional water flow from the actuation of the valve. There also exists a need for a pistol grip nozzle which permits water flow proportional to the actuation of the trigger. There is also a need for an adaptable valve which may be used for metal or plastic irrigation components. There is additionally a need for a hose nozzle which provides flow control without changing the flow pattern.

SUMMARY OF THE INVENTION

The present invention is embodied in a hose nozzle for attachment to a water source and for flow control of water spray. The hose nozzle has an inlet passage and an arcuate wall having an aperture in fluid communication with the inlet passage. A valve has a rotatable water flow cylinder and is in contact with the arcuate wall. The water flow cylinder has a non-circular opening which when rotated to be aligned with the aperture allows water flow proportional to the position of the water flow cylinder into the water flow cylinder. An outlet passage is in fluid communication with the interior of the water flow cylinder.

The invention is also embodied in a hose nozzle with a fixed body structure including a grip portion and a barrel portion extending at an angle from the grip portion. A flow control knob is mounted on the grip portion and has turning movement about a fore and aft extending axis. The body structure defines an interior water passage including an inlet passage portion extending through the hand grip portion and an outlet passage portion extending from the inlet passage portion through the barrel portion. The inlet passage portion has an inlet end formed with a hose end fitting so as to communicate a source of water under pressure contained within a hose with the inlet passage portion. A valve seat in the inlet passage portion is in spaced relation with the inlet end in a position adjacent the outlet passage portion. A valve is mounted in the hand grip portion in cooperating relation with the valve seat in a position within the inlet passage portion for movement between opened and closed positions to control the flow of water under pressure communicated with the inlet passage portion to the outlet passage portion past the valve seat from zero flow when the valve is in a closed position to full flow when the valve is in the opened position and varying flow rates therebetween when the valve is in varying positions between the closed and opened positions. The flow rate is approximately linearly proportional to the rotational position of the valves between the open and closed positions. The knob is connected with the valve so that the position the knob is moved determines the flow rate of the water under pressure flowing to the outlet passage portion.

Another embodiment of the invention is a proportional flow valve assembly for regulating water flow between two water conduits. There is a valve seat fluidly connecting the two water conduits. The flow valve assembly includes a rotatable flow cylinder having an enclosed top surface, an open bottom, and a side surface with a non-circular opening. The flow cylinder is shaped to fit within the valve seat to block water flow between the two water conduits. A valve stem is coupled to the enclosed top surface. The flow cylinder is rotated to allow water flow between the two water conduits. The water flows through the non-circular opening in linear proportion to the angle of rotation of the flow cylinder and out the open bottom of the flow cylinder.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figures 1, 2:
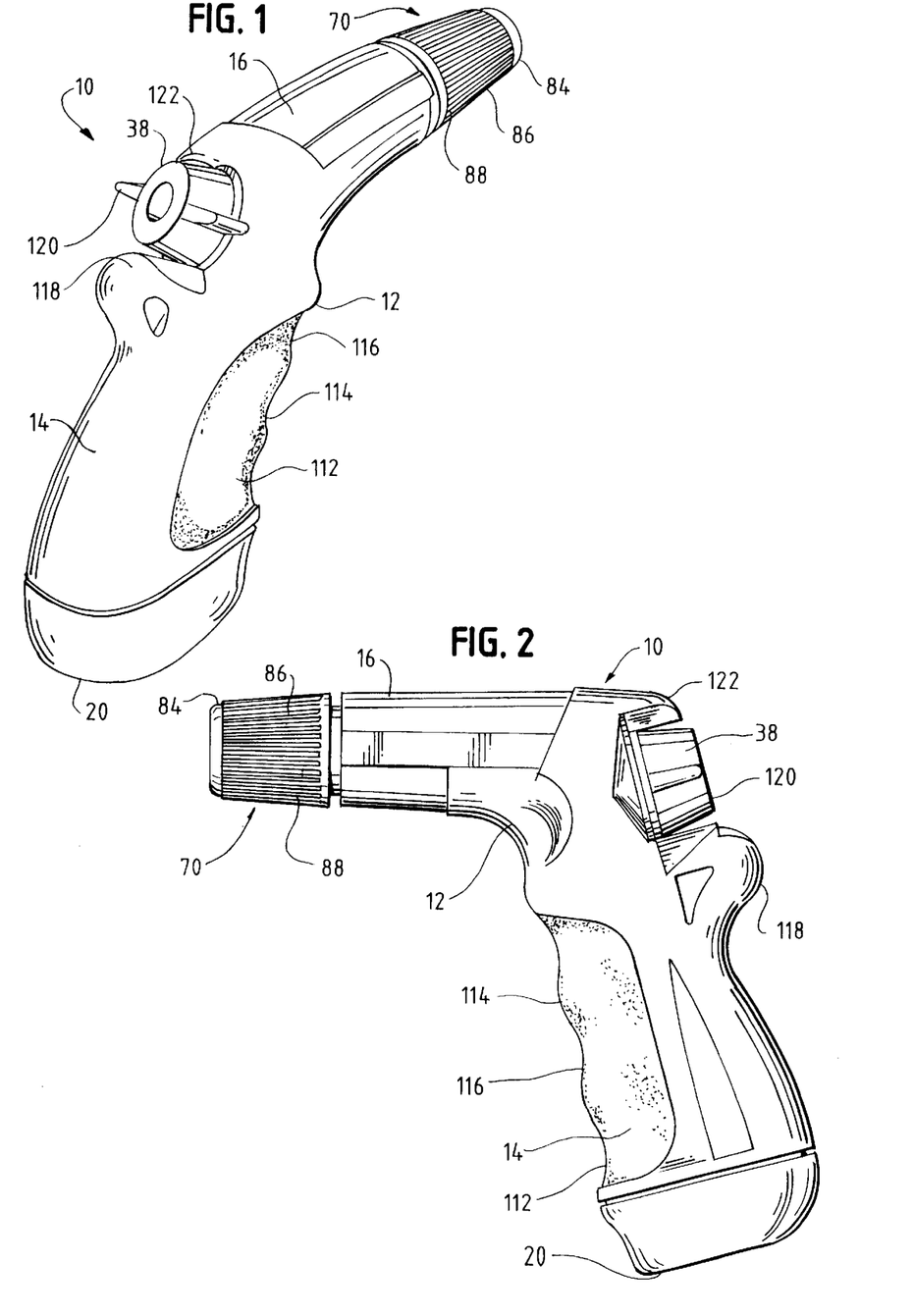
FIG. 1 is a perspective view of a pistol grip hose nozzle in a closed position using a flow control valve according to one embodiment of the present invention.
FIG. 2 is a side view of the pistol grip hose nozzle of FIG. 1.
Figure 3:
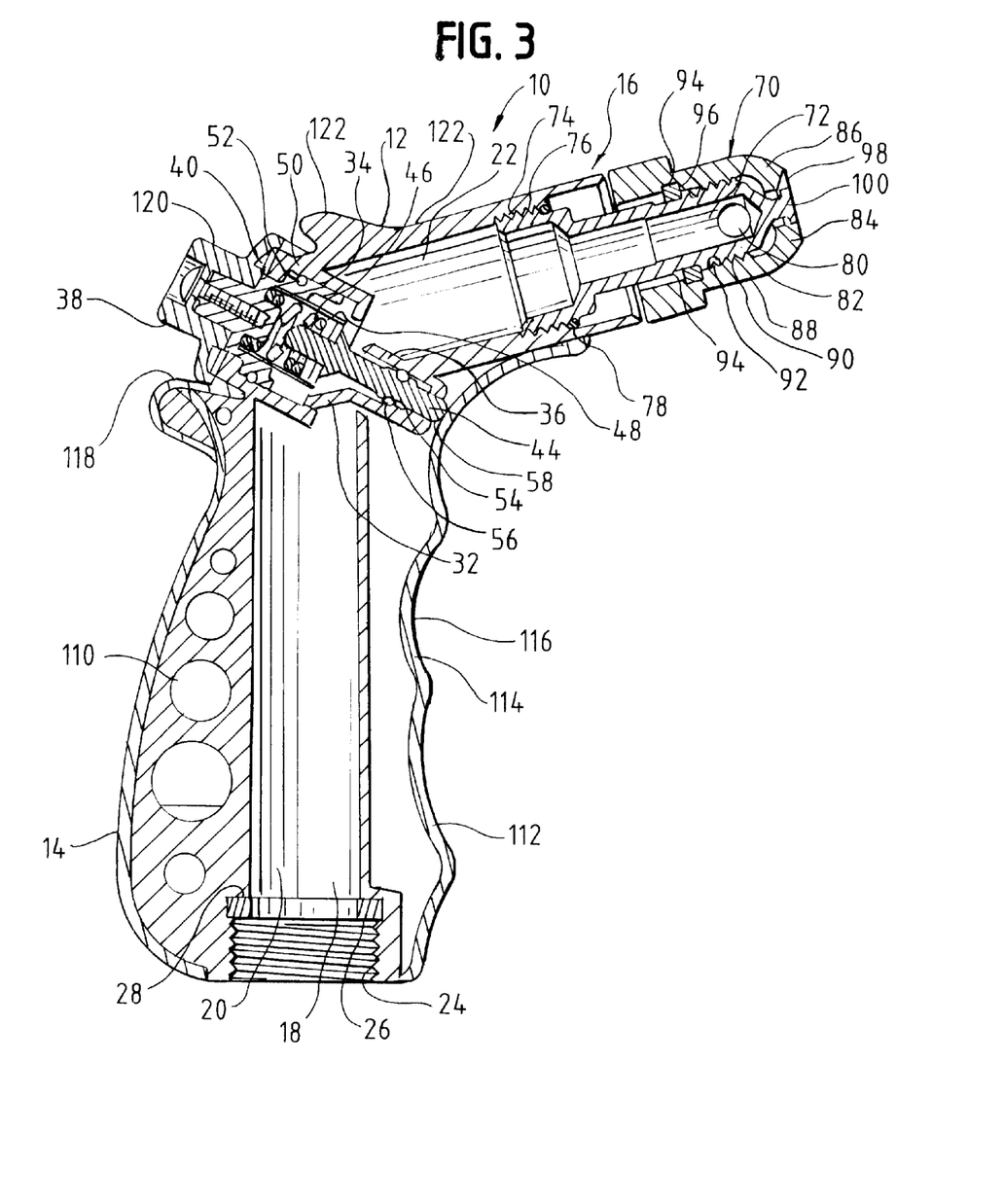
FIG. 3 is a cutaway view of the pistol grip hose nozzle of FIG. 1 in an open position.

Referring now more particularly to FIGS. 1–3 of the drawings, there is shown therein a pistol grip hose nozzle, generally indicated at 10, which is an embodiment of the present invention. As shown, the hose nozzle 10 includes a fixed body structure, generally indicated at 12, including a hand grip portion 14 and a barrel portion 16 extending at an angle from the hand grip portion 14. The body structure 12 defines an interior water passage, generally indicated at 18, including an inlet passage portion 20 extending through the hand grip portion 14 and an outlet passage portion 22 extending from the inlet passage portion 20 through the barrel portion 16. The inlet passage portion 20 has an inlet end formed with interior threads 24 which constitute a female coupling or fitting for inter-engaging with a conventional male hose fitting (not shown) for purposes of communicating a supply of water under pressure with the interior water passage 18. As shown, a resilient washer 26 is fitted within a shoulder 28 spaced inwardly of the threads 24. Of course other types of connections may be made such as a quick connect or other means to connect the hose to the hose nozzle 10.

A wall 32 is formed in the junction between the inlet passage portion 20 and the outlet passage portion 22. A valve member 34 is mounted within an aperture 36 which forms a valve seat. The valve member 34 prevents water flow between the inlet passage portion 20 and the outlet passage portion 22. The valve member 34 has a flow control knob 38 which is connected to a flow control cylinder 40. The flow control cylinder 40 has an opening 42 (shown in FIGS. 4–5) which allows water to flow into the flow control cylinder 40 and flow through the outlet passage portion 22 when the flow control cylinder 40 is properly oriented.

A valve stem 44 extends from the flow control knob 38 and through the central axis of the flow control cylinder 40. A spring 46 is mounted on the stem valve 44 and biases the flow control cylinder 40 in a closed position. The flow cylinder 40 has an exterior surface 48 with an annular groove 50. An O-ring seal 52 forms the valve seal and is located in the annular groove 50. Similarly the valve stem 44 has an annular notch 54 which has an O-ring seal 56 to create a water tight seal. The user rotates the flow control cylinder 40 by rotating the flow control knob 38 causing the opening 42 to rotate to allow the water under pressure coming from the inlet passage portion 20 to the outlet passage portion 22. The annular wall 32 has a mounting tube 58 having an exterior periphery rigidly engaging one end of the valve stem 44.

The forward end of the outlet passage portion 22 has an appropriate stream directing assembly, generally indicated at 70, mounted therein which receives the water under pressure flowing in the outlet passage portion 22 and directs the same in a predetermined discharge pattern from the forward end of the barrel portion 16.

Preferably, the stream directing assembly 70 is of the adjustable type and includes an inner member 72 having an inner end exteriorly threaded, as indicated at 74, to engage with cooperating interior threads 76 formed in the forward end of the outer passage portion 22. An O-ring seal 78 serves to prevent leakage beyond the threaded connection between the exterior of the inner member 72 and the fixed body structure 12. Alternatively the inner member 72 may be sonically welded if constructed from plastic which eliminates the need for the O-ring seal.

Extending inwardly of the inner member 72 from the threaded end 74 thereof is an axially extending bore 80 forming a water flow path through the inner member 72 to a radially outwardly extending opening 82 which serves to communicate the water to the central interior of an outer tubular member 84 disposed in surrounding relation with the inner member 72. As shown, the outer member 84 may have an outer annular elastomeric portion 86 molded thereto. The elastomeric portion 86 is provided with exterior ridges 88 to facilitate turning of the outer member 84. The rearward interior of the outer member 84 is formed with interior threads 90 which meshingly engage exterior threads 92 formed on an adjacent exterior periphery of the inner member 72 so that turning movements of the outer member 84 with respect to the inner member 72 will result in axial movements as well.

The exterior periphery of the inner member 72 includes a cylindrical surface disposed forward of the threads 92 which is sealingly engaged by an O-ring seal 94 carried within an interior groove 96 formed on the interior of the outer tubular member 86. The forward end of the outer tubular member 84 is formed with an outlet orifice 98 and the forward end of the inner member 72 is formed with a stem portion 100 of a conventional configuration. It will be noted that when the outer member 84 is turned into a fully retracted position as shown with respect to the inner member 72, a rearwardly facing sealing surface adjacent the orifice engages a forward facing sealing surface on the inner member 72 to close off flow through the stream directing assembly 70. As the outer tubular member 84 is turned with respect to the inner member 72, the inter-engaging shut-off surfaces are moved axially apart allowing for flow of water through the orifice 98 and past the stem portion 100. The arrangement by which the rate of flow and flow pattern are controlled by turning the outer tubular member 86 and moving the stem portion 100 axially within the orifice 98 is conventional in nature.

The fixed body structure 12 of the hose nozzle shown in FIGS. 1–3 is preferably a zinc casting although other types of metal or plastic may be used. The casting at the hand grip portion 14 is thickened forward and rearward to provide an exterior hand grip contour, the thickened portions' having voids or openings 110 extending laterally therethrough to thereby reduce the amount of zinc utilized in the casting. The voids or openings 110 also serve a retention function for an elastomeric body 112 which is molded over the exterior contour of the hand grip portion 14 so as to provide a final exterior surface grip contour 114 which is insulated by the elastomeric material from the water flowing in the water passage 18 including the inlet passage portion 20. The exact configuration of the hand grip contour 114 can be varied according to whatever shape is desired.

As shown, the hand grip contour 114 includes finger receiving indentations 116 and the opposite surface of the elastomeric body 112 includes an abutment 118 which extends over the base of the thumb. The flow control knob 38 is located just above the abutment 118 and includes diametrically opposed thumb engaging radially extending portions 120. As can be seen from FIG. 1, a user grasping the finger receiving indentations 116 provided by the body of elastomeric material 112 will have their thumb in a position to be easily extended into engagement with the adjacent flow control knob 38 to thereby rotate the knob through into any position within the 90° travel provided. In this regard, it will be noted that an extension of the rearward end of the barrel portion of the zinc casting and a comparable cover from the body of elastomeric material extend above the knob and provide a ledge 122 for protecting the knob 38 from damage as by direct hard surface contact from above, just as the abutment 118 provides comparable protection from the rear.

Figures 4, 5:
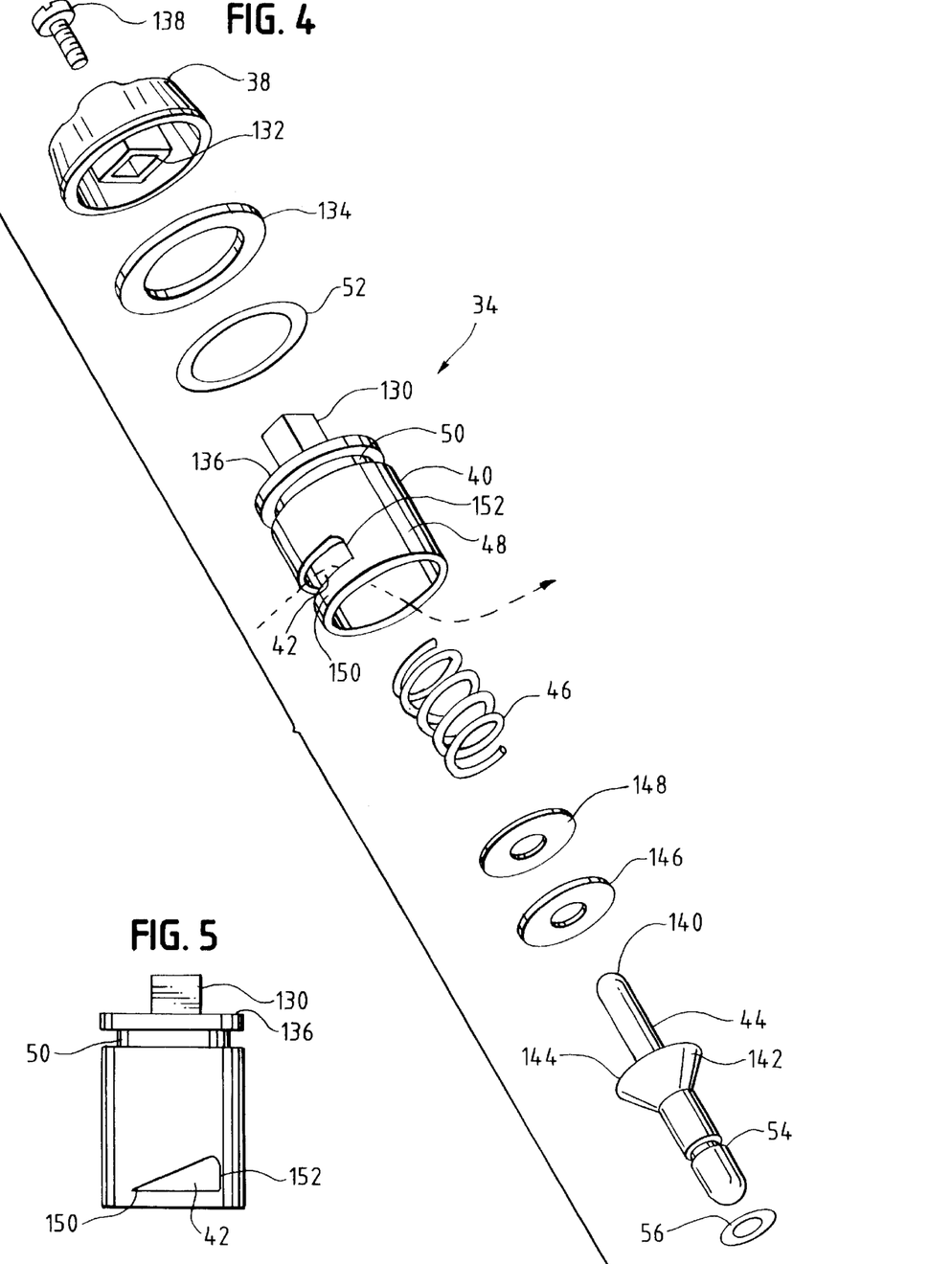
FIG. 4 is an exploded view of the flow cylinder of the pistol hose nozzle of FIG. 1.
FIG. 5 is a perspective close up view of the flow cylinder of the pistol hose nozzle of FIG. 1 according to an embodiment of the present invention.

The valve member 34 will be explained in more detail by referring now more particularly to FIG. 4 which is an exploded view of the valve member 34 and FIG. 5 which is close up view of the flow control cylinder 40 of the valve member 34. The flow control cylinder 40 has the non-circular shaped inlet 42 which allows water to be inlet from the water inlet passage 20. The flow control cylinder 40 has a square mounting peg 130 which matches a square socket 132 on the flow control knob 38. A seal is created between the flow control cylinder 40 and the flow control knob 38 by a retaining ring 134 which is seated on the O-ring 52 and which is placed on a top surface 136 of the flow control cylinder 40. The retaining ring may be metal or plastic depending on the body material of the flow control cylinder 40. As may be understood, the flow control cylinder 40 may be fabricated from plastic such as acetal or metal such as zinc. The retaining ring 134 serves to retain the flow control cylinder 40 within the valve seat. A retaining screw 138 holds the flow control knob 38 to the flow control cylinder 40 via the square mounting peg 130.

The interior of the flow control cylinder 40 has a hollow area which receives an elongated end 140 of the valve stem 44. A plurality of ribs (not shown) may be connected between the walls of the flow control cylinder 40 and the valve stem 44 to center and stabilize the valve stem 44. The valve stem 44 has an annular collar 142 which creates a shoulder 144. A sealing disc 146 sits on the shoulder 144 and a support disc 148 sits on the sealing disc 146. The spring 46 rests around the elongated end 140 of the valve stem 44. The spring 46 serves to resiliently urge the flow control cylinder 40 to the closed position by keeping the inlet 42 oriented in a position preventing fluid communication. The water inlet 42 has a narrow end 150 and a wider end 152.

The operation of the hose nozzle will be explained with reference to FIGS. 1–4. The shape of the inlet 42 is triangular in shape but any non-circular shape such as a trapezoid may be used to achieve roughly linearly proportional water flow to the rotational angle of the flow control knob 38. A hose with pressurized water (not shown) is coupled to the inlet portion 20 by mating a male hose coupler to the threads 24. The pressurized water fills the water passage 18 up to the annular wall 32. The water is blocked from further passage by the closed position of the flow control cylinder 40. The flow control cylinder 40 is biased in this position by the spring 46 and creates a seal to prevent water flow to the outlet portion 22.

The user holds the hose nozzle 10 by gripping the indentations 114 on the handle portion 112 and placing their thumb or thumb and forefinger on the control knob 38. By turning the control knob 38, the flow control cylinder 40 overcomes the force of the spring 46 and rotates to expose the water inlet 42 to the aperture 36. The narrow end 150 of the water inlet 42 is first exposed to the aperture 36 resulting in a relatively low flow of water through the water inlet 42. As the flow control cylinder 40 is rotated further, a greater area of the water inlet 42 is exposed and linearly proportionally greater flow of water is allowed until the wider end 152 is aligned with the aperture 36. Since the shape of the inlet 42 is not circular as the flow control cylinder 40 is rotated, proportionally more water to the rotational angle of the flow control cylinder 40 flows through the water inlet 42 and into the outlet portion 22.

The user may adjust the spray pattern by rotating the outer member 84. When the outer member 84 is retracted, the openings around the stem portion 100 will be restricted resulting in a fan type pattern due to the restricted water flow. As the outer member 84 is extended, the area for water flow around the stem portion 100 increases and thus the water flow increases to a steady stream pattern. Thus, a user may adjust the spray pattern independently of the flow rate since the flow rate is controlled by turning the control knob 38.

Figure 6:
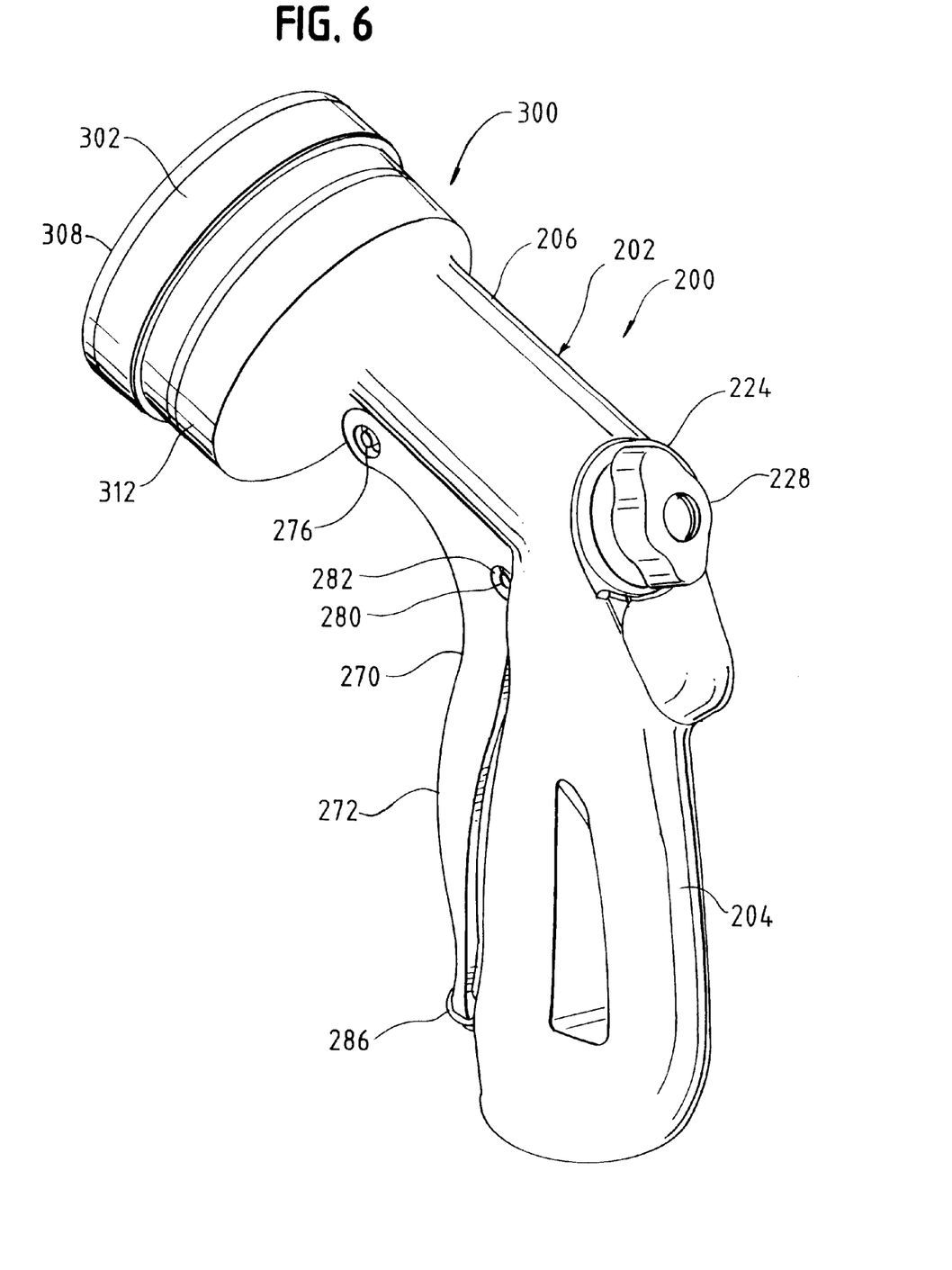
FIG. 6 is a perspective view of another type of pistol grip hose nozzle using a flow control valve according to another embodiment of the present invention.
Figure 7:
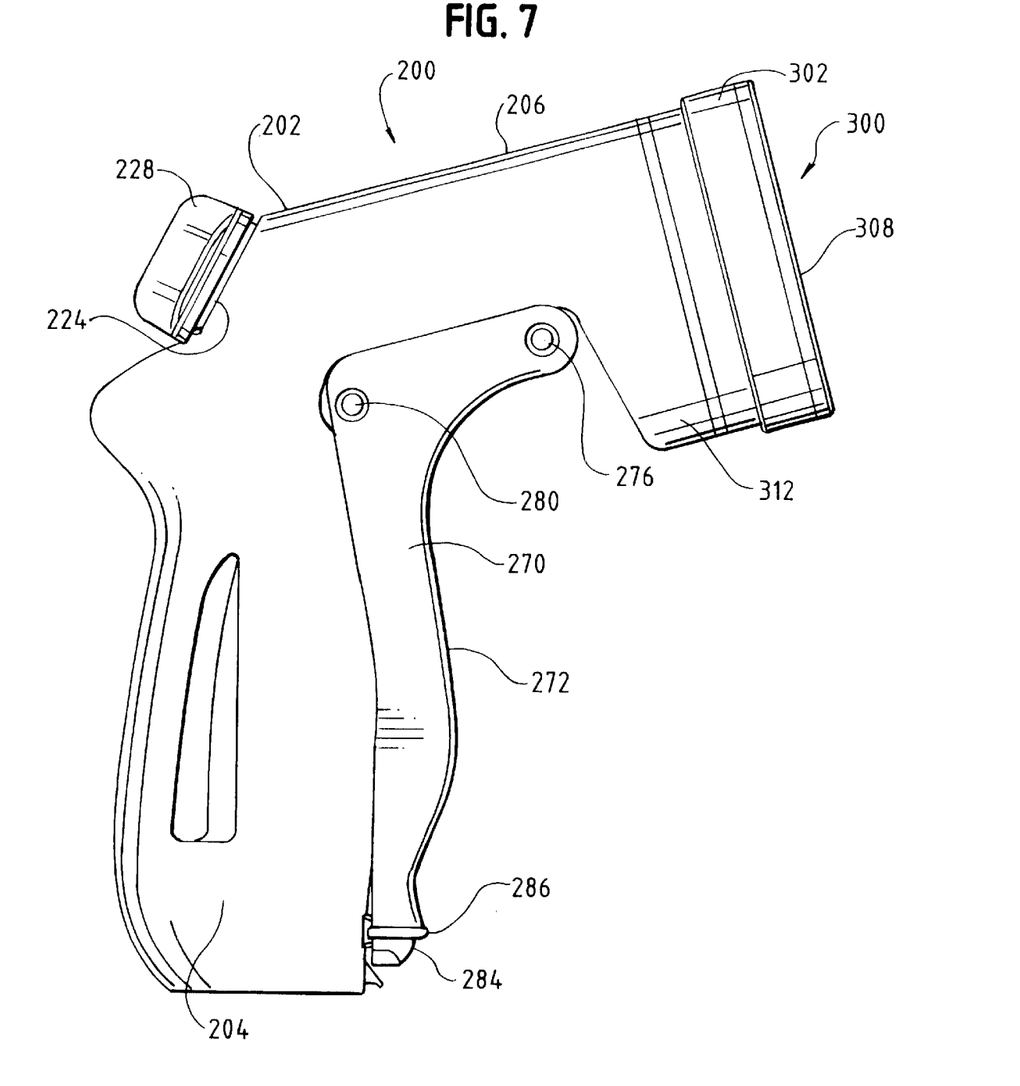
FIG. 7 is a side view of the pistol grip hose nozzle of FIG. 6 according to another embodiment of the present invention.
Figure 8:
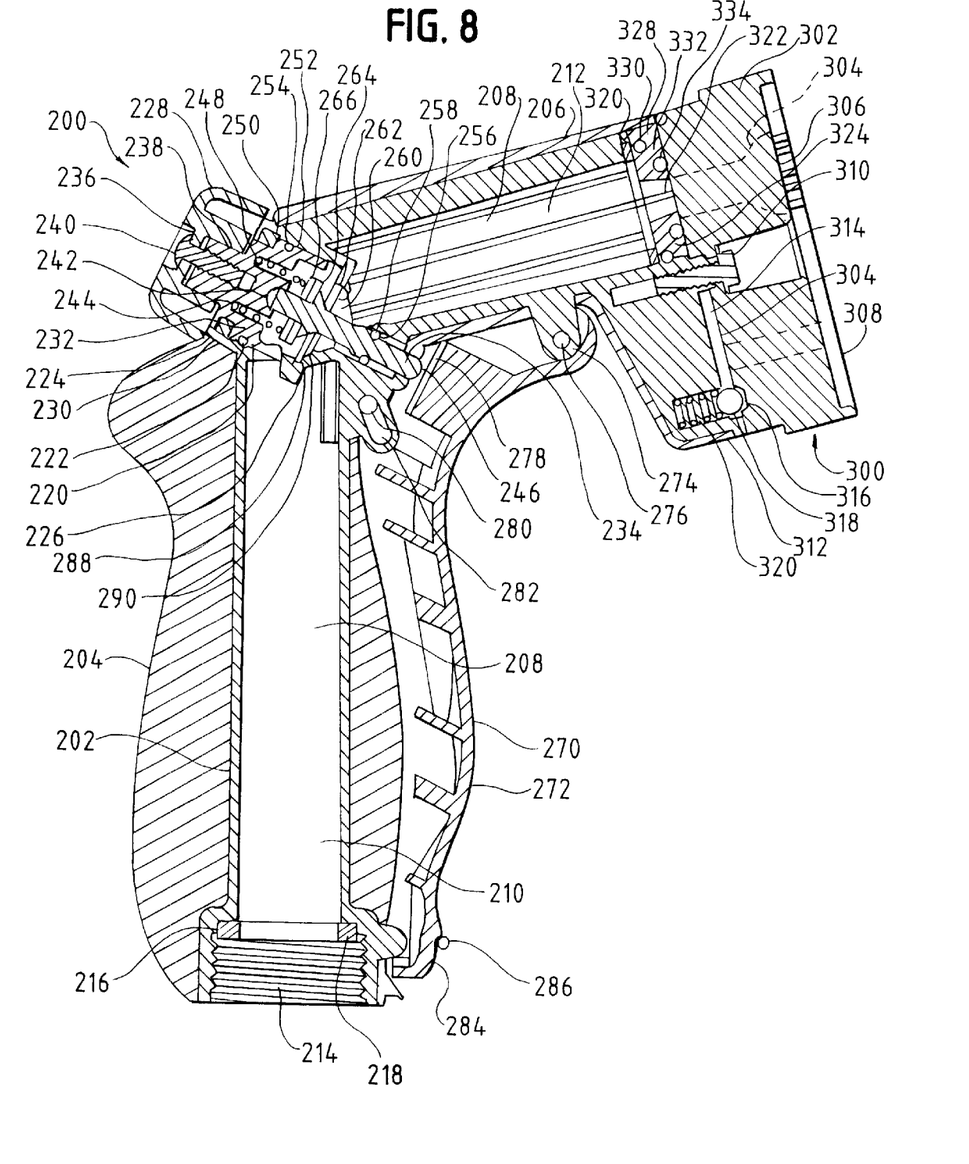
FIG. 8 is a cutaway view of the pistol grip hose nozzle of FIG. 6 with the flow valve in a closed position according to one embodiment of the present invention.

An alternative pistol nozzle 200 with proportional flow is shown in FIGS. 6–8. As shown, the hose nozzle 200 includes a fixed body structure, generally indicated at 202, including a hand grip portion 204 and a barrel portion 206 extending at an angle from the hand grip portion 204. The body structure 202 defines an interior water passage 208, including an inlet passage portion 210 extending through the hand grip portion 204 and an outlet passage portion 212 extending from the inlet passage portion 210 through the barrel portion 206. The inlet passage portion 210 has an inlet end formed with interior threads 214 which constitute a female coupling or fitting for inter-engaging with a conventional male hose fitting (not shown) for purposes of communicating a supply of water under pressure with the interior water passage. A resilient washer 216 is fitted within a shoulder 218 spaced inwardly of the threads 214.

A wall 220 is formed in the junction between the inlet passage portion 210 and the outlet passage portion 212. A valve seat 222 is formed to hold a valve member 224. The valve member 224 rests on a socket 226 which is formed by the valve seat 222. The valve member 224 prevents water flow between the inlet passage portion 210 and the outlet passage portion 212. The valve member 224 has a flow control knob 228 which is connected to a flow control cylinder 230. The flow control cylinder 230 has a non-circular opening 232 which allows water to flow into the flow control cylinder 230 and flow through the outlet passage portion 212 when the flow control cylinder 230 is properly oriented.

A valve stem 234 extends through the central axis of the flow control cylinder 230. The flow control cylinder 230 has an enclosed lid 236. The top of the lid 236 has a protrusion 238 which allows the flow control knob 228 to be attached to the flow control cylinder 230 via a screw 240. The bottom of the lid 236 has a socket 242 which is mated with a rounded end 244 of the valve stem 234. The valve stem 234 has an opposite contact end 246 which extends through the socket 226. A spring 248 is mounted on the stem valve 234 and biases the flow control cylinder 230 in a closed position. The flow cylinder 230 has an exterior surface 250 with an annular groove 252. An O-ring seal 254 forms the valve seal and is located in the annular groove 252. Similarly the valve stem 234 has an annular notch 256 which has an O-ring seal 258 to create a water tight seal.

The valve stem 234 has an annular collar 260 which creates a shoulder 262. A sealing disc 264 sits on the shoulder 262 and a support disc 266 sits on the sealing disc 264. The spring 248 serves to resiliently urge the flow control cylinder 230 to the closed position keeping the non-circular opening 232 oriented in a position away from the water inlet passage 210. As explained above, the non-circular opening 232 is shaped to achieve linearly proportional water flow to the rotational angle of the flow control knob 228. The user may set the appropriate water flow rate by rotating the flow control knob 228 and thus different amounts of water will flow through the cylinder 230 through the non-circular opening 232 depending on the position of the flow control knob 228.

A trigger 270 is located substantially parallel to the hand grip portion 214 and has a front hand grip 272 which is shaped to a user's fingers. The barrel portion 216 has a tab 274 which has a pivot 276 which allows the trigger 270 to rotate. The trigger 270 has a flat contact surface 278 which contacts the contact end 246 of the valve stem 234 when the trigger 270 is engaged. The trigger 270 has a pin 280 which slides in a guide slot 282 and constrains the motion of the trigger 270. The trailing end of the trigger 270 has an indentation 284 which may be locked down with a bail 286 attached to the hand grip portion 214. In this manner, the trigger 270 may be locked in a spray position.

The trigger 270 in a non-spray position is rotated around the pivot 276 such that the pin 280 slides to one end of the guide slot 282. In this manner the contact surface 278 is moved away from the contact end 246 of the valve stem 234. The annular collar 260 forms a seal by contact with a sealing disc 288 sitting on a support disc 290. The annular collar 260 prevents water flow from the interior of the cylinder 230 to the water passage 212.

When a user squeezes the trigger 270 to the spray position, the contact surface 278 moves the valve stem 234 thus lifting the annular collar 260 from the sealing disc 288. Water from the inlet passage 210 is forced through the non-circular opening 232 to the interior of the flow cylinder 230 then can exit through to the outlet passage 212. By rotating the flow control knob 228 to set a certain flow rate, water at different flow rates may be controlled and delivered by squeezing the trigger 270.

The forward end of the outlet passage portion 212 has an appropriate stream directing assembly, generally indicated at 300, mounted therein which receives the water under pressure flowing in the outlet passage portion 212 and directs the same in a predetermined discharge pattern from the forward end of the barrel portion 206.

The stream directing assembly 300 has a multiple spray head dial 302. The spray head dial 302 has a number of different outlet passages 304 which lead to different spray patterns of water outlets 306. The spray head dial 302 has a front surface 308 which may have a variety of spray patterns. In the preferred embodiment, the spray head dial 302 has five different outlet passages 304 and corresponding spray patterns located on the front surface 308. The spray head dial 302 is rotated about a bolt 310 which is set in a front coupler 312 of the barrel portion 206. The spray head dial 302 has a rear surface 314 which has a series of detents 316. The detents 316 lock into a ball bearing 318 which is urged forward by a spring 320. The ball bearing 318 in conjunction with the detents 316 lock the spray head dial 302 so a specific spray pattern and outlet passage are fluidly coupled to the outlet passage 212. The user may rotate the spray head dial 302 to selected another spray pattern.

Water from the outlet passage portion 212 is directed toward a connecting passage 322 to the outlet passage 304 of the dial head 302. The connector passage 322 has an annular sealing collar 324 which is insulated by a cushion disc 326. The annular sealing collar 324 has an exterior groove 328 which has an O-ring seal 330 which serves to prevent leakage beyond the connector passage 322. The annular sealing collar 324 also has a top groove 332 which has an O-ring seal 324 to insure that water does not leak between the barrel portion 206 and the spray head dial 302.

Figure 9:
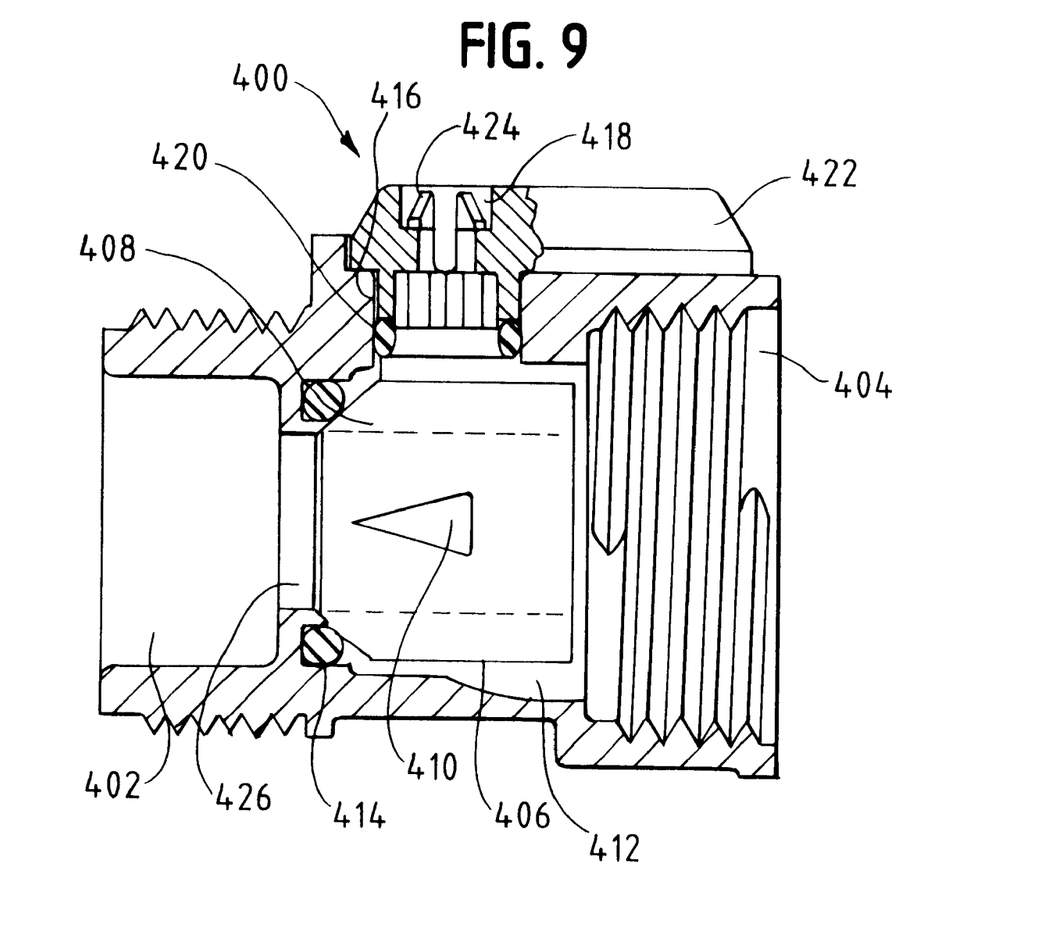
FIG. 9 is a cutaway view of a flow cylinder valve with proportional flow control according to one embodiment of the present invention which is regulating water flow in a water conduit.

It is to be understood that proportional flow valves such as the valve member 34 shown in FIGS. 1–5 or valve member 224 in FIGS. 6–8 may be used to regulate water flow between any two water conduits. The use of a proportional flow valve assembly 400 is shown in FIG. 9. The flow valve assembly 400 regulates the water flow between an upstream water conduit 402 and a downstream water conduit 404. The flow valve assembly 400 is located in a valve seat 406 which is formed between the water conduits 402 and 404. The flow valve assembly 400 has a rotatable flow cylinder 408. The rotatable flow cylinder 408 has a non-circular opening 410 which is trapezoidally shaped but may be of any shape which allows proportional flow of water through the cylinder 408. The rotatable flow cylinder 408 has an open end 412 which allows water to flow to the water conduit 404 when the valve assembly 400 is on.

The valve assembly 400 is insulated via an O-ring 414. The valve seat 406 has a top aperture 416. The top of the flow cylinder 408 has a stem 418 which extends out of the top aperture 416. The stem 418 is insulated from water leaking via an O-ring 420. A switch handle 422 is connected to the stem 418. The switch handle 422 is connected to the stem 418 by a series of retaining arms 424. Of course other means may be used to connect the switch handle 422 to the stem 418.

The valve seat 406 has an aperture 426 which provides fluid connection to the fluid conduit 402. The flow cylinder 408 is shown in a closed position since the non-circular opening 410 is in a position by which allows the flow cylinder 408 to block water flow from the water conduit 402 through the flow cylinder 408 and out the open end 412 to the downstream water conduit 404. Rotating the flow cylinder 408 via the switch handle 422 exposes the non-circular or proportionally shaped opening 410 to water flow from the water conduit 402. This permits proportional water flow to the degree of rotation of the flow cylinder 408.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A proportional flow valve assembly for regulating water flow between two water conduits having a valve seat fluidly connecting the two water conduits, the flow valve assembly comprising:
   a rotatable flow cylinder having an enclosed top surface, an open bottom, and a side surface with a non-circular opening, the flow cylinder being shaped to fit within the valve seat to block water flow between the two water conduits;
   a valve stem coupled to the interior of the enclosed top surface, the valve stem extending out through the open bottom; and
   wherein the flow cylinder is rotated to allow water flow between the two water conduits, the water flowing through the non-circular opening in linear proportion to the angle of rotation of the flow cylinder and out the open bottom of the flow cylinder.

2. The flow valve assembly of claim 1 wherein the flow cylinder is metal.

3. The flow valve assembly of claim 1 wherein the flow cylinder is plastic.

4. The flow valve assembly of claim 1 wherein the non-circular opening is a triangular shape.

5. The flow valve assembly of claim 1 wherein the non-circular opening is a trapezoidal shape.

6. A flow valve assembly for regulating water flow between two water conduits having a valve seat fluidly connecting the two water conduits, the flow valve assembly comprising:
   a rotatable flow cylinder having an enclosed top surface, an open bottom, and a side surface with a non-circular opening, the flow cylinder being shaped to fit within the valve seat to block water flow between the two water conduits;
   a valve stem coupled to the enclosed top surface;
   wherein the flow cylinder is rotated to allow water flow between the two water conduits, the water flowing through the non-circular opening in linear proportion to the angle of rotation of the flow cylinder and out the open bottom of the flow cylinder; and
   a spring placed around the valve stern within the rotatable flow cylinder to bias the rotatable flow cylinder in a selected position.

7. A valve assembly for use with a fixed body structure defining an interior water passage including an inlet passage portion and an outlet passage portion, the valve assembly comprising:
   a valve seat mountable between the outlet passage and the inlet passage portions;
   an exterior cylinder having an aperture attached to the valve seat such that the aperture is in fluid communication with the inlet passage;
   a rotatable cylinder having an open bottom end in fluid communication with the outlet passage and an inlet aperture, the rotatable cylinder in cooperating relation with said exterior cylinder for rotating movement between opened and closed positions to control the flow of water communicated between said inlet passage portion to said outlet passage portion from zero flow when said rotatable cylinder is in a closed position to full flow when said rotatable cylinder is in an opened position aligning the inlet aperture with the aperture and varying flow rates therebetween when said rotatable cylinder is in varying positions between said closed and opened positions;
   wherein the flow rate is proportional to the position of said valve between said open and closed position; and
   a valve stem, extending through the open bottom end of the rotatable cylinder, having one end rotatably mounted in the valve seat and a second end attached to the closed end of the rotatable cylinder.

8. The valve assembly of claim 7 further comprising a knob connected with the rotatable cylinder so that the position the knob is moved determines the flow rate of the water under pressure flowing to said outlet passage portion.

9. The valve assembly of claim 7 wherein the rotatable cylinder is metal.

10. The valve assembly of claim 7 wherein the rotatable cylinder is plastic.

11. The valve assembly of claim 7 wherein the interior aperture is a triangular shape.

12. The valve assembly of claim 7 wherein the interior aperture is a trapezoidal shape.

13. The valve assembly of claim 7 further comprising a spring placed around the valve stem to bias the rotatable cylinder in a selected position.

* * * * *